(12) United States Patent
Pan et al.

(10) Patent No.: US 11,274,714 B2
(45) Date of Patent: Mar. 15, 2022

(54) ELECTROMAGNETIC BRAKING SYSTEM AND CONTROL METHOD FOR RAPID COMPRESSION MACHINE

(71) Applicant: Tianjin University, Tianjin (CN)

(72) Inventors: Jiaying Pan, Tianjin (CN); Lei Wang, Tianjin (CN); Haiqiao Wei, Tianjin (CN); Gequn Shu, Tianjin (CN); Changwen Liu, Tianjin (CN); Guobin Ma, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 16/621,254

(22) PCT Filed: Mar. 8, 2019

(86) PCT No.: PCT/CN2019/077567
§ 371 (c)(1),
(2) Date: Dec. 11, 2019

(87) PCT Pub. No.: WO2020/034629
PCT Pub. Date: Feb. 20, 2020

(65) Prior Publication Data
US 2021/0324926 A1    Oct. 21, 2021

(30) Foreign Application Priority Data

Aug. 14, 2018 (CN) .......................... 201810922488.1
Aug. 14, 2018 (CN) .......................... 201810922489.6

(51) Int. Cl.
*F16D 63/00* (2006.01)
*F16D 66/00* (2006.01)
(Continued)

(52) U.S. Cl.
CPC ...... *F16D 63/002* (2013.01); *F16D 2066/003* (2013.01); *F16D 2121/04* (2013.01); *F16D 2121/20* (2013.01)

(58) Field of Classification Search
CPC ............. F16D 63/022; F16D 2066/003; F16D 2121/04; F16D 2121/20; F01L 9/20; F02D 13/0253
See application file for complete search history.

(56) References Cited

U.S. PATENT DOCUMENTS 6,152,094 A * 11/2000 Kirschbaum ............. F01L 9/20
                                                 123/90.11
6,397,797 B1 * 6/2002 Kolmanovsky ........... F01L 9/20
                                                 123/90.11
(Continued)

FOREIGN PATENT DOCUMENTS

CN      103527316 A *  1/2014
CN      203730449 U *  7/2014
(Continued)

OTHER PUBLICATIONS

Translation of CN 103527316 obtained from website: https://worldwide.espacenet.com on Aug. 17, 2021.*
(Continued)

*Primary Examiner* — Pamela Rodriguez
(74) *Attorney, Agent, or Firm* — George G. Wang; Bei & Ocean (57) ABSTRACT

An electromagnetic braking system and control method, with the system having a CCU, a braking cylinder, a push rod, an electromagnetic braking ring, an electromagnetic braking piston fixed to the push rod, a first shading plate and a second shading plate, a photoelectric sensor fixed near the push rod, and an electromagnetic braking control circuit, and the control method including following the steps: initial estimating of the braking distance (l) according to the
(Continued)

current magnitude, electromagnetic force between the two electromagnetic coils and initial velocity (v) of the push rod, arranging a restoration distance ($\Delta l$) between the top dead center and the piston after braking, installing two shading plates and the photoelectric sensor; and setting the distance between the two electromagnetic coils to when the starts braking.

4 Claims, 4 Drawing Sheets

(51) Int. Cl.
  *F16D 121/04* (2012.01)
  *F16D 121/20* (2012.01)

(56) References Cited

U.S. PATENT DOCUMENTS

| | | | | |
|---|---|---|---|---|
| 6,681,728 B2 * | 1/2004 | Haghgooie | ............... | F01L 9/20 123/90.11 |
| 6,741,441 B2 * | 5/2004 | Hilbert | ..................... | F01L 9/20 361/160 |
| 7,014,167 B2 * | 3/2006 | Fuwa | .................. | F02D 13/0253 251/129.04 |
| 8,038,122 B2 * | 10/2011 | Gelez | ....................... | F01L 9/20 251/129.04 |

FOREIGN PATENT DOCUMENTS

CN 10-2016-0119308 A * 10/2016
CN 109297714 A * 2/2019

OTHER PUBLICATIONS

Translation of CN 203730449 obtained from website: https://worldwide.espacenet.com on Aug. 17, 2021.*
Translation of KR 10-2016-0119308 obtained from website: https://worldwide.espacenet.com on Aug. 17, 2021.*
Translation of CN 109297714 obtained from website: https://worldwide.espacenet.com on Aug. 17, 2021.*

* cited by examiner

ELECTROMAGNETIC BRAKING SYSTEM AND CONTROL METHOD FOR RAPID COMPRESSION MACHINE

FIELD OF THE INVENTION

The invention relates to an electromagnetic braking system and control method for a rapid compressor, involves in the technical field of thermal energy and power engineering testing, and in particular relates to a system and control method of rapid compressor for combustion engine simulation and fuel chemical kinetics research.

BACKGROUND OF THE INVENTION

The rapid compressor provides a fundamental experimental platform to simulate the combustion engine working process and fuel combustion. The process of the rapid compressor simulates a single compression stroke of the combustion engine is as follows: pushing the compression piston by external force, instantaneously compressing the premixed gas in the combustion chamber to reach a high temperature and high pressure thermodynamic state, and then stopping the compression piston by the braking system to maintain the premixed gas in the combustion cylinder in a high temperature and high pressure thermodynamic equilibrium state. By studying the combustion state of the in-cylinder mixture at the top dead center (hereinafter referred to as TDC) of the piston of the rapid compressor, the in-cylinder combustion process under different thermodynamic conditions of the combustion engine can be obtained indirectly. Compared with combustion engines, the rapid compressor has a simple structure, so that a single compression stroke and a combustion process of the combustion engine can be studied without being affected by the complicated influencing factors. In addition, the rapid compressor can also change the structure of the combustion chamber more conveniently so as to simulate the abnormal combustion phenomenon, such as the knocking of the combustion engine, greatly reducing the development cost of the combustion engine.

Traditional rapid compressors rely on pneumatic drive, using hydraulic or mechanical braking. However, there are some defects in these two methods. For example, the hydraulic braking method is highly dependent on the working conditions, which commonly causes the piston rebound so as to change the thermodynamic state in the cylinder, affecting the ignition delay time and combustion phase; whereas the mechanical braking method works better than the hydraulic braking method, but there are mechanical wear and impact problems that affect the mechanical structure and personal safety. To overcome the above problems, a rapid compressor and control method based on electromagnetic braking is proposed, which provides an efficient, stable and safe operation for rapid compressors over a wide range of operating conditions.

Therefore, a heretofore unaddressed need exists in the art to address the aforementioned deficiencies and inadequacies.

SUMMARY OF THE INVENTION

The objectives of the present invention are to provide an electromagnetic braking system and control method fora rapid compressor. The present invention utilizes the principle of electromagnetic enhancement and the characteristics of "like charges repel, but opposite charges attract" of the magnet to design the working process. The technical scheme of the present invention is as follows.

An electromagnetic braking system comprises a central control unit (CCU), a braking cylinder made of magnetic isolating material, a push rod passing through the braking cylinder, an electromagnetic braking ring fixed to the braking cylinder, an electromagnetic braking piston fixed to the push rod, a first shading plate and a second shading plate fixed to the push rod, respectively, a photoelectric sensor fixed near the push rod, and an electromagnetic braking control circuit. Wherein, a circumferentially wound electromagnetic coil is embedded in the electromagnetic braking ring and in the electromagnetic braking piston, respectively; the first shading plate and the second shading plate are fixed at the positions of the push rod corresponding to the start of braking and the end of braking. The distance between the shading plates is equal to the braking distance l, and the photoelectric sensor is disposed near the position of the first shading plate at the time of the start of braking; signals of the two shading plates are detected by the photoelectric sensor and sent to the CCU; and the CCU obtains a shading time of the first shading plate according to the detecting signal detected by the photoelectric sensor, and obtains an instantaneous speed calculated according to the thickness m of the first shading plate.

The electromagnetic braking control circuit includes a DC power supply, a slide rheostat and three switches; wherein, one switch acts as an on-off switch, and the other two switches as transfer switches. The DC power supply is connected in series with the slide rheostat, and then connected in parallel at two ends of two paralleled electromagnetic coils; one electromagnetic coil is connected in series with the on/off switch for controlling the current on/off, the other end of the other electromagnetic coil is respectively connected in series with two transfer switches for controlling the current on/off and the direction of current. The DC power supply is used to supply current, and the slide rheostat is used to adjust the magnitude of the current to adjust the magnitude of the electromagnetic force.

The present invention also provides a control method by adopting the system, including the following steps of:

step 1, initial estimating the braking distance l according to the current magnitude, electromagnetic force between the two electromagnetic coils and initial velocity v of the push rod, arranging a restoration distance $\Delta l$ between the top dead center and the piston after braking, so that the electromagnetic braking piston and the electromagnetic braking ring are further tightened; installing two shading plates and the photoelectric sensor; setting the distance between the two electromagnetic coils as $L=l+\Delta l$ when starting the braking;

step 2, increasing the air pressure in the driving cylinder, closing the on-off switch and the transfer switch in series with the two electromagnetic coils simultaneously, and adjusting the slide rheostat P to increase the current synchronously, so that the current flow of the electromagnetic braking piston is opposite to that of the electromagnetic braking ring; since current generates a magnetic field, currents having opposite flows generate mutually exclusive electromagnetic forces, air pressure for driving the piston generated by the electromagnetic force and the air pressure in the cylinder can be balanced by properly adjusting the current magnitude; when the air pressure is increased to the required pressure, disconnecting the switches in the control circuit, so that the balance in the push rod is broke, and the electromagnetic force disappears, the compression stroke starts due to the unilateral air pressure;

step 3, moving the push rod forwardly, when the first position signal is detected, that is when the first shading plate blocks the photoelectric sensor, calculating, by the CCU, the initial velocity of the push rod according to the thickness m and the shading time of the first shading plate, and calculating the current magnitude when the braking distance equals to l; closing three switches by the CCU and supplying the corresponding current by automatically adjusting the slide rheostat P; meanwhile, remaining the current flows of the two electromagnetic coils opposite to each other, so that currents having opposite flows generate mutually exclusive electromagnetic forces, taking the electromagnetic repulsion as a resistance so as to impede the movement of the push rode;

step 4, decelerating the push rod forwardly, when the second position signal is detected, that is when the second shading plate blocks the photoelectric sensor, the piston of the rapid compressor still has a small speed and has a small distance Δl from the top dead center; at this time, switching the transfer switches to the same port by the CCU, so that the currents of the two electromagnetic coils are in the same direction, and the currents generate mutual attraction electromagnetic forces; changing current magnitude so that the piston of the rapid compressor fully reaches the top dead center under the action of the air pressure of the driving cylinder and electromagnetic force, thus further tightening the electromagnetic braking piston and the electromagnetic brake ring, thereby preventing the piston from rebounding; further, balancing the in-cylinder pressure generated during the combustion by the air pressure of the driving cylinder and the electromagnetic force.

Grooves and protrusions are correspondingly arranged on the electromagnetic braking piston and the electromagnetic brake ring, respectively, in the present invention so as to fit correspondingly.

Compared to the prior art, the present invention combines the electromagnetic principle and the working characteristics of the rapid compressor, and uses the advanced control unit and the control method, has the advantages of significantly reducing rebound phenomenon of the piston, reducing the brake noise, so that obtained experimental data is more accurate and reliable, and thus closer to the actual operating conditions of the internal combustion engine. Meanwhile, the present invention captures the position signal and the speed signal through the sensor and feeds back the current signal, thereby generating an electromagnetic force fitting the magnitude and the speed, and more accurately stopping the piston at the preset position, thereby achieving a better control effect.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

Wherein:

| | |
|---|---|
| 1: combustion chamber | 2: electromagnetic braking system |
| 3: driving device | 4: piston |
| 5: electromagnetic shielding braking cylinder | 6: shading plate a |
| 7: shading plate b | 8: push rod |
| 9: electromagnetic braking ring | 10: electromagnetic braking piston |
| 11: photoelectric sensor | 12: insulating ring |
| 13: electromagnetic coil | 14: groove |
| 15: insulating plate | 16: protrusion |

DETAILED DESCRIPTION OF THE EMBODIMENTS

The present invention will be described in detail below with reference to the drawings in conjunction with the embodiments. The invention is not limited to the specific embodiment, and the description is not intended to limit the thereto.

Figure 1:
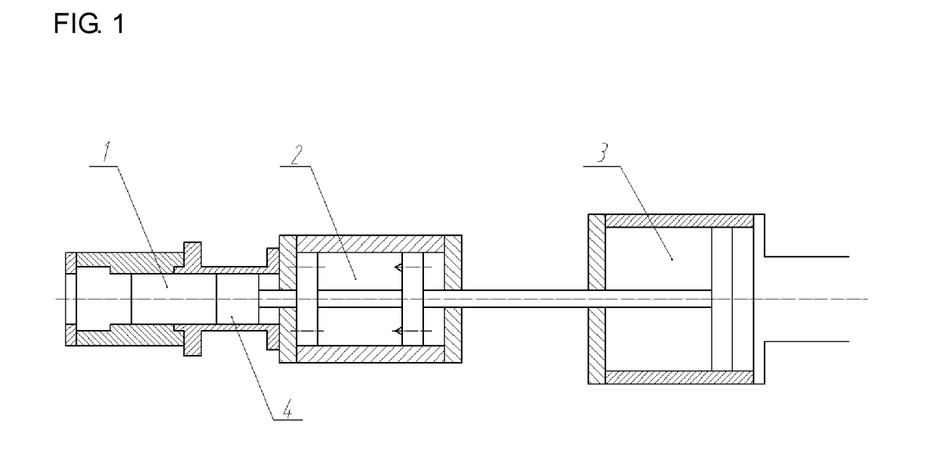
FIG. 1 is a schematic diagram of an electromagnetic braking rapid compressor according to the present invention.

FIG. 1 shows a schematic diagram of an electromagnetic braking rapid compressor according to the present invention, including a combustion chamber 1, an electromagnetic braking system 2, a driving device 3 and a piston 4.

Figure 2:
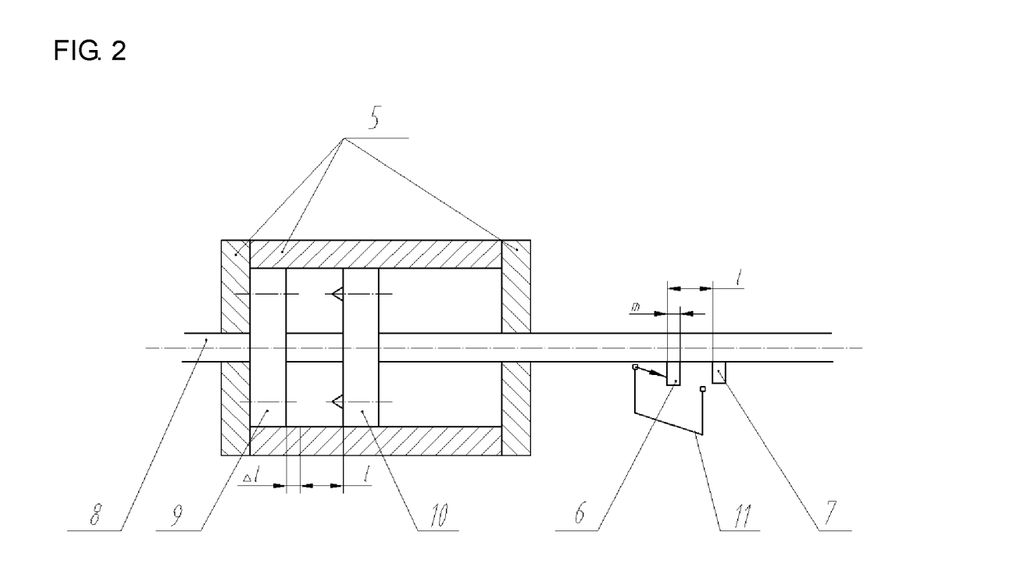
FIG. 2 is a layout schematic diagram of the components in the braking cylinder according to the present invention.

FIG. 2 shows a schematic diagram of the electromagnetic braking system. The electromagnetic braking system includes an electromagnetic shielding braking cylinder 5 made of magnetic isolating material, a push rod 8 passing through the electromagnetic shielding braking cylinder 5, an electromagnetic braking ring 9 fixed to the electromagnetic shielding braking cylinder 5, an electromagnetic braking piston 10 fixed to the push rod 8, two shading plates 6 and 7 and a photoelectric sensor 11 fixed near the push rod. The positions of two shading plates 6 and 7 and the photoelectric sensor 11 are calibrated by experiments.

Further, the shading plate 6 has a thickness of m, the distance between the two shading plates is l, which is the braking distance when the piston decelerates during braking process, Δl is the distance that the piston from acceleration to the stop due to resistance when the current flow of the electromagnetic braking piston is opposite to that of the electromagnetic braking ring. When the receiver of the photoelectric sensor 11 is not shaded by the shading plates, the receiver detects the light emitted from an emitter; otherwise, the receiver cannot detect any emitters, the photoelectric sensor 11 transmits the signal to the CCU, and the instantaneous velocity can be calculated by the shading time and the thickness m of the shading plate 6.

Figure 3A:
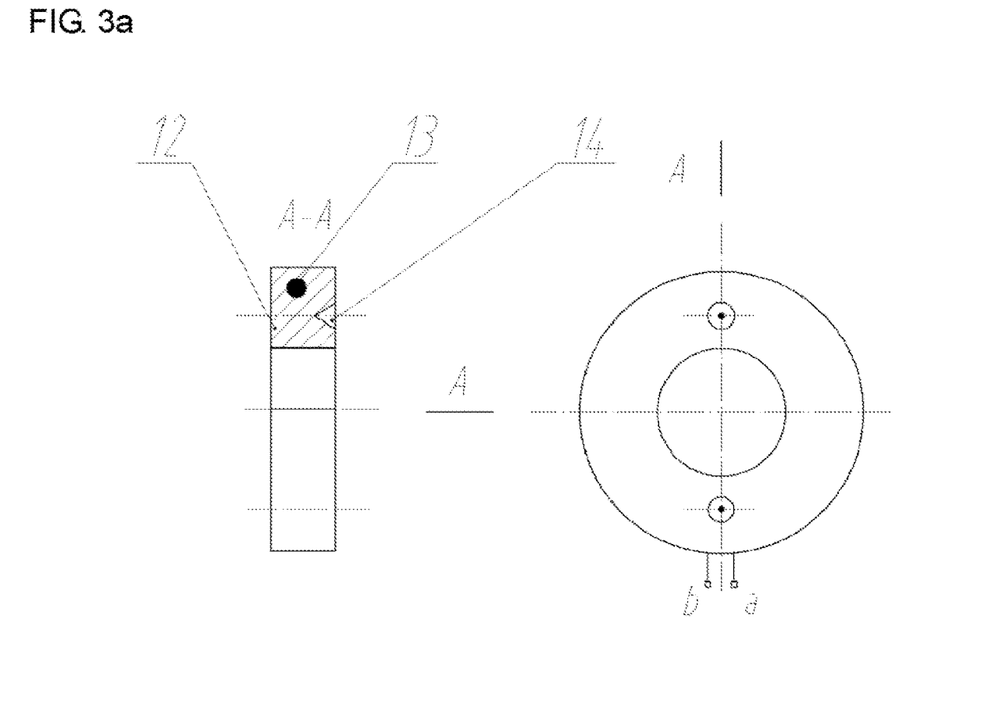
FIG. 3a is a front view and a right side view of the electromagnetic braking ring on the braking cylinder.

As shown in the FIG. 3a, an insulating ring 12 is mounted on the electromagnetic shielding braking cylinder 5, and a circumferentially wound electromagnetic coil 13 is embedded in the insulating ring 12, the insulating ring 12 and the electromagnetic coil 13 constitute the electromagnetic brake ring 9.

Figure 3B:
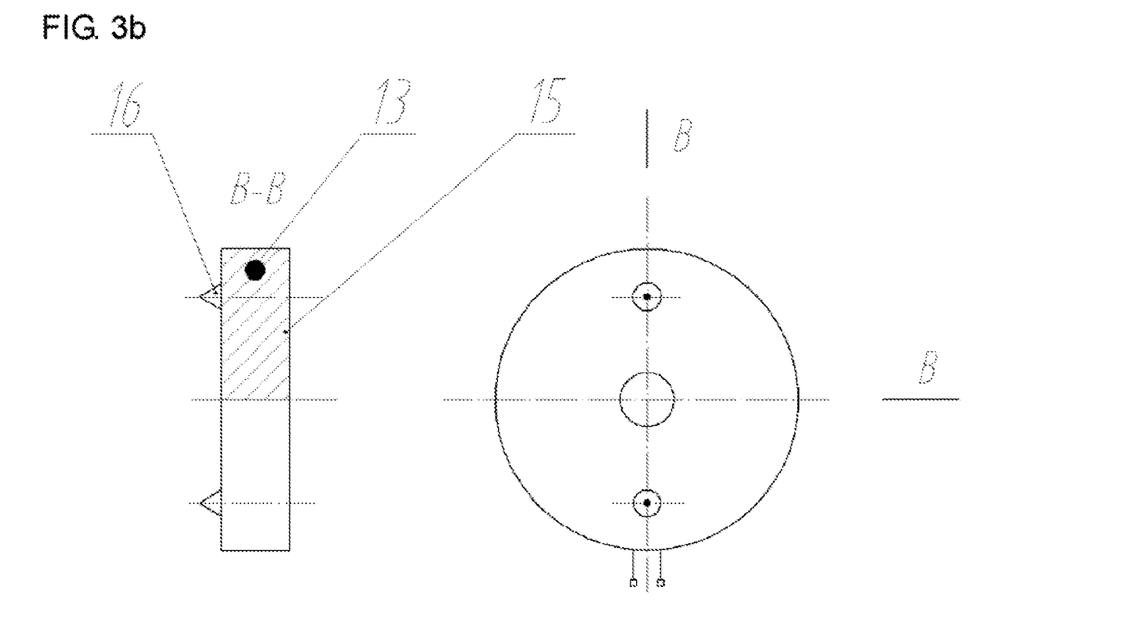
FIG. 3b is a front view and a left side view of the electromagnetic braking piston on the braking cylinder.

As shown in the FIG. 3b, the electromagnetic braking piston 10 is fixed on the push rod 8, which consists of an insulating plate 15 and the circumferentially wound electromagnetic coil 13 embedded therein. Wherein, the electromagnetic coils 12, 13 have the same material and the same conductivity. Further, the electromagnetic braking ring provides with two grooves 14, and the electromagnetic braking piston provides with two protrusions 16 corresponding to the grooves 14, so that the electromagnetic braking ring and the electromagnetic braking piston can fit each other when contacting.

Figure 4:
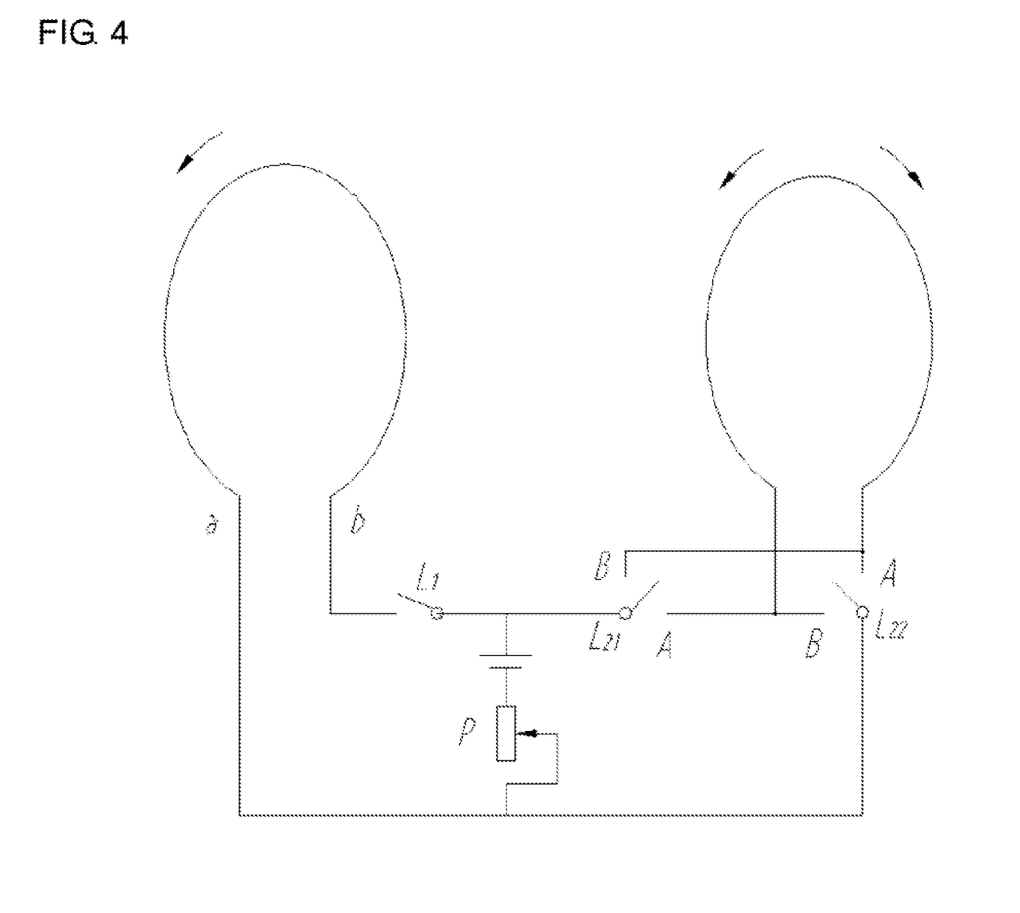
FIG. 4 is an electromagnetic control circuit schematic diagram according to the present invention.

FIG. 4 shows an electromagnetic control circuit schematic diagram according to the present invention, including three switches $L_1$, $L_{21}$, $L_{22}$, a DC power supply, a slide rheostat P and wires. Wherein, the switches are used to control the current on/off, that is, to control the presence or absence of electromagnetic force, the DC power supply is used to supply current, and the slide rheostat is used to adjust the current magnitude so as to adjust the magnitude of the electromagnetic force.

Figure 5:
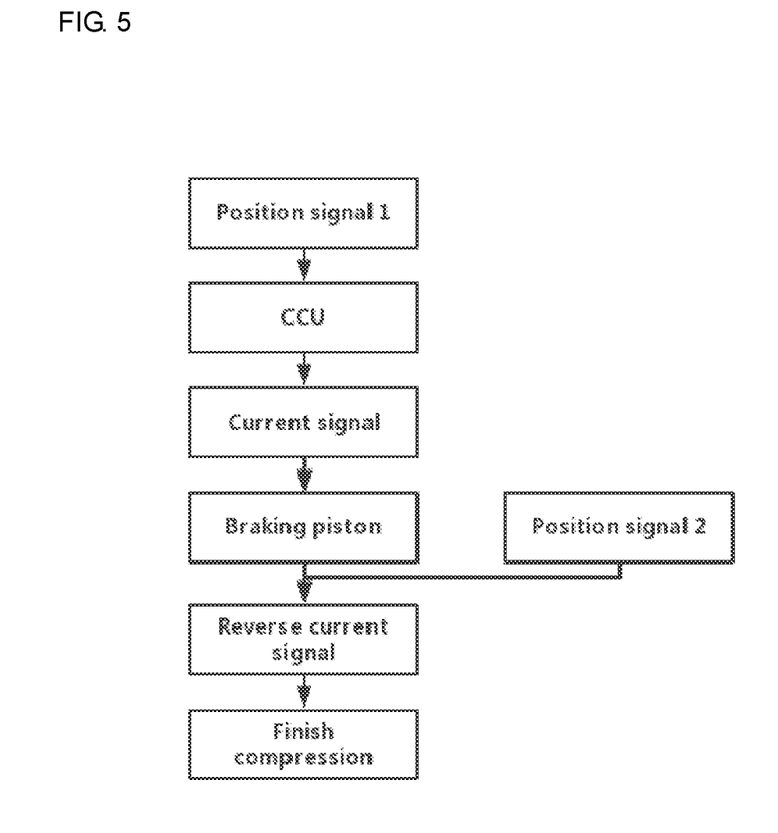
FIG. 5 is a control flow chart according to the present invention.

FIG. 5 is a control flow chart according to the present invention, which is completed by the sensor, the CCU, the switches and the slide rheostat.

The detailed control process is as follows.

Step 1, two shading plates 6 and 7 are fixed at the positions of the push rod corresponding to the start of braking and the end of braking. The shading plates have a certain distance from the braking cylinder to prevent the braking cylinder from colliding with the shading plates after braking. The distance between the shading plates is equal to the braking distance l, and the photoelectric sensor 11 is disposed near the position of the shading plate 6 at the time of the start of braking. The electromagnetic force formula of the two electromagnetic coils is as follows:

$$F = \frac{\mu_0 I_1 I_2}{\sqrt{(R_1 + R_2)^2 + d^2}} \left[ K(k) - \frac{1 + k'^2}{2k'^2} E(k) \right],$$

which is adopted to initial estimate the braking distance l according to the current magnitude I and initial velocity v of the push rod when braking. Due to the large electromagnetic braking force having a good braking effect, the distance l between two shading plates 6 and 7 is normally small. Besides, a restoration distance Δl between the top dead center and the piston 4 after braking is provided, so that the electromagnetic braking piston 10 and the electromagnetic braking ring 9 are further tightened. Before braking, the distance between the two electromagnetic coils is L=l+Δl, at this time, the photoelectric sensor is shaded by the shading plate a, and the receiver cannot detect any emitters.

Step 2, the air pressure in the driving cylinder 3 is increased, and the switch $L_1$ of the electromagnetic coil is closed, the switch $L_{21}$ connects to port A, the switch $L_{22}$ connects to port A, and the slide rheostat P is adjusted to increase the current synchronously, so that the current flow of the electromagnetic braking piston 10 is opposite to that of the electromagnetic braking ring 9. Since current generates a magnetic field, currents having opposite flows generate mutually exclusive electromagnetic forces, by electromagnetic force formula of the two electromagnetic coils, it can be seen that an increase in current will increase the electromagnetic force there between. Accordingly, air pressure for driving the piston generated by the electromagnetic force and the air pressure in the cylinder can be balanced by properly adjusting the current magnitude. When the air pressure is increased to the required pressure, the switches $L_1$, $L_{21}$, $L_{22}$ in the control circuit are disconnected, so that the balance in the push rod is broke, and the electromagnetic force disappears, the compression stroke starts due to the unilateral air pressure.

Step 3, the push rod moves along the direction of the top dead center, when the first position signal is detected, that is when the first shading plate blocks the photoelectric sensor, the CCU calculates the initial velocity of the push rod according to the thickness m and the shading time of the first shading plate 6. By the electromagnetic force formula of the two electromagnetic coils and energy conservation formula to obtain:

$$\frac{1}{2}mv^2 - 0 = \int_0^1 F(x)dx$$

which is adopted to calculate the required current magnitude when the braking distance equals to 1. Since the electromagnetic force is much larger than the in-cylinder driving force during the electromagnetic braking, the in-cylinder driving force is ignored herein, and only the electromagnetic braking force is considered. At this time, the CCU closes the switch L1, switches the switch L21 to the port A, switches the switch L22 to the port A, and the slide rheostat P is adjusted to supply the current correspondingly. At this time, the current flow of the electromagnetic braking piston 10 is still opposite to that of the electromagnetic braking ring 9, but theoretically, the currents in the two electromagnetic coils are much larger than the current during the balancing process. The currents with opposite current flows generate mutually exclusive electromagnetic forces between electromagnetic coils as a resistance so as to impede the movement of the push rod. It can be seen from the formula that the ever-shrinking distance between the two electromagnetic coils will lead to an increase in the electromagnetic force, thereby better achieving the effect of electromagnetic braking.

Step 4, the push rod moves along the direction of the top dead center retarded. Due to the presence of the in-cylinder driving force and the delay of feedback, when the second position signal is detected, that is when the second shading plate blocks the photoelectric sensor, the piston 4 still has a small speed and has a small distance Δl from the top dead center; at this time, the CCU switches the switch $L_{21}$ to the port B, switches the switch $L_{22}$ to the port B, and changes the current magnitude adequately. At this time, the currents of the two electromagnetic coils are in the same direction and the currents generate mutual attraction electromagnetic forces, so that the piston fully reaches the top dead center under the action of the air pressure of the driving cylinder and electromagnetic force, thus further tightening the electromagnetic braking piston and the electromagnetic brake ring, thereby preventing the piston from rebounding. Further, the in-cylinder pressure generated during the combustion is balanced by the air pressure of the driving cylinder and the electromagnetic force.

After experiment, the switches $L_1$, $L_{21}$, $L_{22}$ of the electromagnetic braking circuit are disconnected, and the air pressure in the driving cylinder is removed. The slide rheostat P is adjusted to supply small reverse current so as to close the switch $L_1$, switches the switch $L_{21}$ to the port A, switches the switch $L_{22}$ to the port A, thereby generating a weak mutually exclusive electromagnetic force between the electromagnetic coils so as to make the push rod slowly return to the initial position.

In conclusion, the present invention relates to an electromagnetic braking control method based on a rapid compressor, including the installation of the sensor of the electromagnetic braking system, design of the electromagnetic braking circuit and electromagnetic braking control flow. The control method of the present invention is more convenient and accurate to control the braking of the compression piston of the rapid compressor, which plays an important role in the braking control of the rapid compressor.

Although the functions and working processes of the present invention have been described above with reference to the accompanying drawings, the present invention is not limited thereto. The foregoing specific implementations are merely illustrative but not limiting. A person of ordinary skill in the art may make various forms under the teaching of the present invention without departing from the purpose of the present invention and the protection scope of the appended claims, and all the forms shall fall into the protection scope of the present invention.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. An electromagnetic braking system, comprising a central control unit (CCU);
    a braking cylinder made of magnetic isolating material;
    a push rod passing through the braking cylinder;
    an electromagnetic braking ring fixed to the braking cylinder;
    an electromagnetic braking piston fixed to the push rod;
    a first shading plate and a second shading plate fixed to the push rod, respectively;
    a photoelectric sensor fixed near the push rod; and
    an electromagnetic braking control circuit;
    wherein, a circumferentially wound electromagnetic coil is embedded in the electromagnetic braking ring and in the electromagnetic braking piston, respectively;
    the first shading plate and the second shading plate being fixed at the positions of the push rod corresponding to the start of braking and the end of braking;
    the distance between the shading plates being equal to a braking distance (l), and the photoelectric sensor being disposed near the position of the first shading plate at the time of the start of braking;
    signals of the two shading plates being detected by the photoelectric sensor and being sent to the (CCU); and
    the (CCU) obtaining a shading time of the first shading plate according to the detecting signal detected by the photoelectric sensor, and obtaining an instantaneous speed calculated according to the thickness (m) of the first shading plate;
    the electromagnetic braking control circuit includes a DC power supply, a slide rheostat and three switches; wherein,
    one switch acting as an on-off switch, and the other two switches as transfer switches;
    the DC power supply is connected in series with the slide rheostat, and then connected in parallel at two ends of two paralleled electromagnetic coils; one electromagnetic coil is connected in series with the on/off switch for controlling the current on/off, the other end of the other electromagnetic coil is respectively connected in series with the two transfer switches for controlling the current on/off and the direction of current; the DC power supply is used to supply current, and the slide rheostat is used to adjust the magnitude of the current to adjust the magnitude of the electromagnetic force.

2. The electromagnetic braking system of claim 1, wherein grooves and protrusions are correspondingly arranged on the electromagnetic braking piston and the electromagnetic brake ring, respectively, so as to fit to each other.

3. A control method by adopting the system of claim 1, including the following steps of:
    step 1, initial estimating the braking distance (l) according to the current magnitude, electromagnetic force between the two electromagnetic coils and initial velocity (v) of the push rod,
    arranging a restoration distance ($\Delta l$) between a top dead center and the piston after braking, so that the electromagnetic braking piston and the electromagnetic braking ring are further tightened;
    installing the two shading plates and the photoelectric sensor;
    setting the distance between the two electromagnetic coils as when starting the braking;
    step 2, increasing the air pressure in the driving cylinder, closing the on-off switch and the transfer switch in series with the two electromagnetic coils simultaneously, and adjusting the slide rheostat P to increase the current synchronously, so that the current flow of the electromagnetic braking piston is opposite to that of the electromagnetic braking ring; since current generates a magnetic field, currents having opposite flows generate mutually exclusive electromagnetic forces, air pressure for driving the piston generated by the electromagnetic force and the air pressure in the cylinder can be balanced by adjusting the current magnitude; when the air pressure is increased to the required pressure, disconnecting the switches in the control circuit, so that the balance in the push rod is broke, and the electromagnetic force disappears, the compression stroke starts due to the unilateral air pressure;
    step 3, moving the push rod forwardly, when a first position signal is detected, that is when the first shading plate blocks the photoelectric sensor, calculating, by the CCU, the initial velocity of the push rod according to the thickness (m) and the shading time of the first shading plate, and calculating the current magnitude when the braking distance equals to l; closing three switches by the CCU and supplying the corresponding current by automatically adjusting the slide rheostat (P); meanwhile, remaining the current flows of the two electromagnetic coils opposite to each other, so that currents having opposite flows generate mutually exclusive electromagnetic forces, taking the electromagnetic repulsion as a resistance so as to impede the movement of the push rod;
    step 4, decelerating the push rod forwardly, when the second position signal is detected, that is when the second shading plate blocks the photoelectric sensor, the piston of the rapid compressor still has a small speed and has a small distance ($\Delta l$) from the top dead center; at this time, switching the transfer switches to the same port by the CCU, so that the currents of the two electromagnetic coils are in the same direction, and the currents generate mutual attraction electromagnetic forces; changing current magnitude so that the piston of the rapid compressor fully reaches the top dead center under the action of the air pressure of the driving cylinder and electromagnetic force, thus further tightening the electromagnetic braking piston and the electromagnetic brake ring, thereby preventing the piston from rebounding; further, balancing the in-cylinder pressure generated during the combustion by the unilateral air pressure of the driving cylinder and the electromagnetic force.

4. The control method of claim 3, wherein grooves and protrusions are correspondingly arranged on the electromagnetic braking piston and the electromagnetic brake ring, respectively, so as to fit to each other.

* * * * *